United States Patent
Klaar

(10) Patent No.: US 6,724,099 B2
(45) Date of Patent: Apr. 20, 2004

(54) METHOD AND APPARATUS FOR STARTING UP A TURBOSET

(75) Inventor: Juergen Klaar, deceased, late of Neukirchen-Vluyn (DE), by Gisela Klaar, heiress

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/226,801

(22) Filed: Aug. 23, 2002

(65) Prior Publication Data

US 2003/0038483 A1 Feb. 27, 2003

(30) Foreign Application Priority Data

Aug. 24, 2001 (EP) .............................. 01120357

(51) Int. Cl.$^7$ ................................. F02C 6/00

(52) U.S. Cl. .......................................... 290/52; 290/31

(58) Field of Search ........................ 290/52, 31, 38 R

(56) References Cited

U.S. PATENT DOCUMENTS

| | | | | |
|---|---|---|---|---|
| 3,772,526 A | * | 11/1973 | Alwers | 290/38 R |
| 4,093,869 A | * | 6/1978 | Hoffmann et al. | 290/31 |
| 4,772,802 A | * | 9/1988 | Glennon et al. | 290/31 |
| 4,868,406 A | * | 9/1989 | Glennon et al. | 290/4 R |
| 5,055,700 A | * | 10/1991 | Dhyanchand | 290/31 |
| 5,068,590 A | * | 11/1991 | Glennon et al. | 322/10 |
| 5,430,362 A | * | 7/1995 | Carr et al. | 318/779 |
| 5,493,200 A | | 2/1996 | Rozman et al. | |
| 5,587,647 A | * | 12/1996 | Bansal et al. | 322/45 |
| 5,920,162 A | * | 7/1999 | Hanson et al. | 318/254 |
| 6,462,429 B1 | * | 10/2002 | Dhyanchand et al. | 290/31 |
| 6,486,640 B2 | * | 11/2002 | Adams | 322/59 |

\* cited by examiner

*Primary Examiner*—Joseph Waks

(57) ABSTRACT

In order to achieve efficient utilization of components required for the generator operation, during the run-up of a turboset having a gas turbine, a generator and also a rectifier exciter, the latter is operated as an asynchronous generator, via which the rotor winding of the generator is supplied with direct current. As a result, neither slip rings nor a separate starting motor are required for the start-up of the turboset.

8 Claims, 3 Drawing Sheets

METHOD AND APPARATUS FOR STARTING UP A TURBOSET

CROSS-REFERENCE TO RELATED APPLICATIONS

This application claims priority to EP/01120357.7 filed Aug. 24, 2001 under the European Patent Convention and which is incorporated by reference herein in its entirety.

FIELD OF THE INVENTION

The invention relates to a method of running up a turboset having a gas turbine and a three-phase generator excited with a brushless rotating rectifier exciter. It also relates to an apparatus for carrying out the method.

SUMMARY OF THE INVENTION

A turboset, in particular having a three-phase synchronous generator, is normally used for the generation of electrical energy in a power plant. The turboset comprises a gas turbine, the three-phase synchronous generator and an excitation current device. The three-phase current generated is tapped at the stator winding of the generator, while the rotor winding for generating a magnetic field is excited with direct current. The direct current is provided by a brushless rotating rectifier exciter or by a static thyristor-controlled excitation device via slip rings. A brushless rectifier exciter with stationary poles is coupled to the generator in such a way that its rotor rotates with the generator shaft. In this case, the three-phase current generated at first in the exciter can be rectified by means of rectifiers rotating with the rotor shaft of the exciter. The direct current generated by such a rectifier exciter can be passed directly, without slip rings, to the rotor of the generator.

In contrast to a turboset having a steam turbine as drive, a gas turbine cannot run up the turboset independently. The turboset is generally run up from the "turning operation" with a speed of about 100 rev/min to 200 rev/min, for which an oil-hydraulic drive is usually used. As is well known, it is not until a gas turbine is at a sufficient speed of about 1000 rev/min that it can be ignited and assume the further run-up to the rated speed. In order to reach this limit speed, a separate "starting motor" or the generator, as frequency-controlled motor, may be used for the run-up.

If a starting motor is used, it is mechanically connected to the turboset via a clutch and runs the turboset up to the requisite limit speed. If the gas turbine assumes the further run-up, the motor is uncoupled. For this arrangement, the type of excitation of the generator is unimportant if the design of the "free shaft end" on the excitation side of the generator is disregarded.

For the run-up with a frequency-controlled generator, for which a thyristor-controlled starting device is required, which feeds current into the armature winding of the generator, a brief speed-dependent excitation of the rotor winding of the generator is required. In a generator having slip rings, this feeding is effected from a static rectifier station. Disadvantages associated with this are in particular wear and other disturbances with regard to the slip rings and/or carbon brushes, which have to be designed for the continuous operation of the generator. If the turboset has a rotating brushless exciter set attached to the generator shaft or if this exciter set is directly coupled electrically and mechanically, frequency-controlled run-up is not readily possible, since the requisite excitation of the field winding of the generator is absent. Intermediate excitation for the run-up operation via auxiliary slip rings is certainly conceivable but likewise entails disadvantages associated with the slip rings.

The object of the invention is therefore to specify a method of running up a turboset having a gas turbine and a brushless rotating rectifier, in which method efficient utilization of components which are necessary for the generator operation is achieved. Furthermore, an apparatus especially suitable for carrying out the method is to be specified.

With regard to the method, said object is achieved according to the invention by the features of the claims. Advantageous developments are the subject matter of the claims.

In the method according to the invention, a three-phase current is supplied to a stator winding (field winding) of a rectifier exciter arranged on a shaft together with a generator and a turbine, this three-phase current producing a rotary field, the rotary speed of which differs from that of the shaft and induces a three-phase voltage in the rotor winding. The current generated in the rotor winding by the induced voltage is rectified by a rectifier rotating with the rotor winding and is supplied as direct current to a rotor winding of the generator, through the stator winding of which a frequency-controlled three-phase current is passed.

With regard to the apparatus, the object is achieved by the features of the claims. To this end, the excitation winding in the stator of the rectifier, through which excitation winding direct current flows during generator operation of the turboset, is changed in its function and used as a three-phase excitation winding. So that the excitation flux is large enough at all speeds, the exciter is operated as an asynchronous generator with reverse field. By the interposition of a three-phase AC power controller in the three-phase circuit feeding into the stator winding of the exciter, the excitation flux can be controlled in accordance with the run-up. Via this rectifier exciter changed in its function, the current can be passed to the generator rotor without slip rings. The generator, which is not equipped with slip rings, i.e. it is free of slip rings, can therefore work as a converter-fed motor, so that no separate starting motor is required.

The feeding in three-phase circuit of the field winding of the rectifier exciter is switched off as soon as the limit speed has been reached, starting from which the turbine, driven at first by the generator acting as motor, runs up independently. After the run-up operation has been completed, the rectifier exciter can be used in a function known per se, direct current being fed into the stator winding. Alternatively, three-phase current may be fed into the stator winding of the rectifier exciter, this three-phase current being asynchronous relative to the constant rated speed of the turboset. A voltage regulator circuit for the turbogenerator can be constructed via the three-phase AC power controller.

BRIEF DESCRIPTION OF THE DRAWINGS

Starting from principles known per se, an exemplary embodiment of the invention is explained in more detail below with reference to drawings, in which.

DESCRIPTION OF THE PREFERRED EMBODIMENTS

Figure 1:
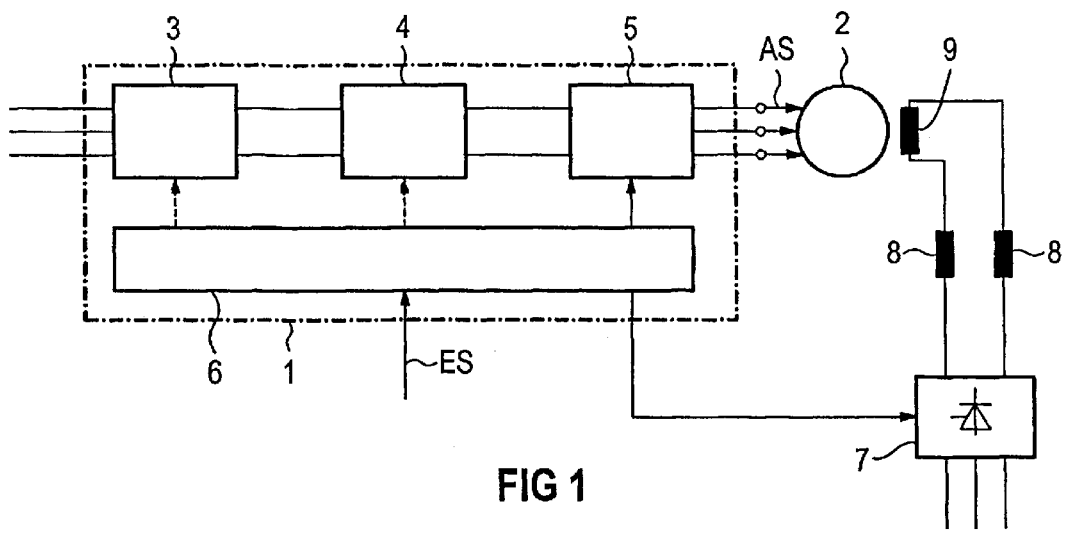
FIG. 1 shows a block diagram of a known indirect converter with current feeding into a converter-fed motor.

FIG. 1 shows an indirect converter 1 fed with three-phase current for the frequency-controlled three-phase supply of a converter-fed motor 2 during the run-up operation. In normal operation after completion of the run-up operation, the converter-fed motor 2 is used as a generator for power generation. The indirect converter 1 comprises a rectifier 3, an intermediate circuit 4, which, for example, contains a choke, an inverter 5 and also an open-loop and closed-loop control 6, to which, inter alia, a clock signal of a shaft (not shown) of the converter-fed motor 2 is supplied as input signal ES. A direct current corresponding to the degree of loading of the converter-fed motor 2 is applied to the intermediate circuit 4 during the run-up operation. The inverter 5, which is timed and directed by the converter-fed motor 2, converts the direct current into a pulse-shaped and voltage-variable (sinusoidal pulse-width modulation) output signal AS forming a rotary field. The open-loop and closed-loop control 6 is connected to an excitation current supply 7 which supplies an excitation current $I_{f2}$ to a rotor 9 of the converter-fed motor 2 via slip rings 8. A rotary field which rotates in synchronism with the rotor 9 is generated in the converter-fed motor 2 by the output signal AS of the inverter 5.

The excitation current supply 7 is normally designed as a static thyristor assembly. For a constant torque of the converter-fed motor 2, the voltage and frequency of the output signal AS of the indirect converter 1 change in proportion to one another. Two types of indirect converter 1 are used, namely voltage-source and current-source converters. When a limit speed at which a gas turbine (not shown) can continue the run-up is reached, the indirect converter 1 and the excitation current supply 7 are switched off and electrically isolated from the converter-fed motor 2, acting as a generator in normal operation, in order to be able to switch this converter-fed motor 2 to the systems required for the generator operation.

Figure 2:
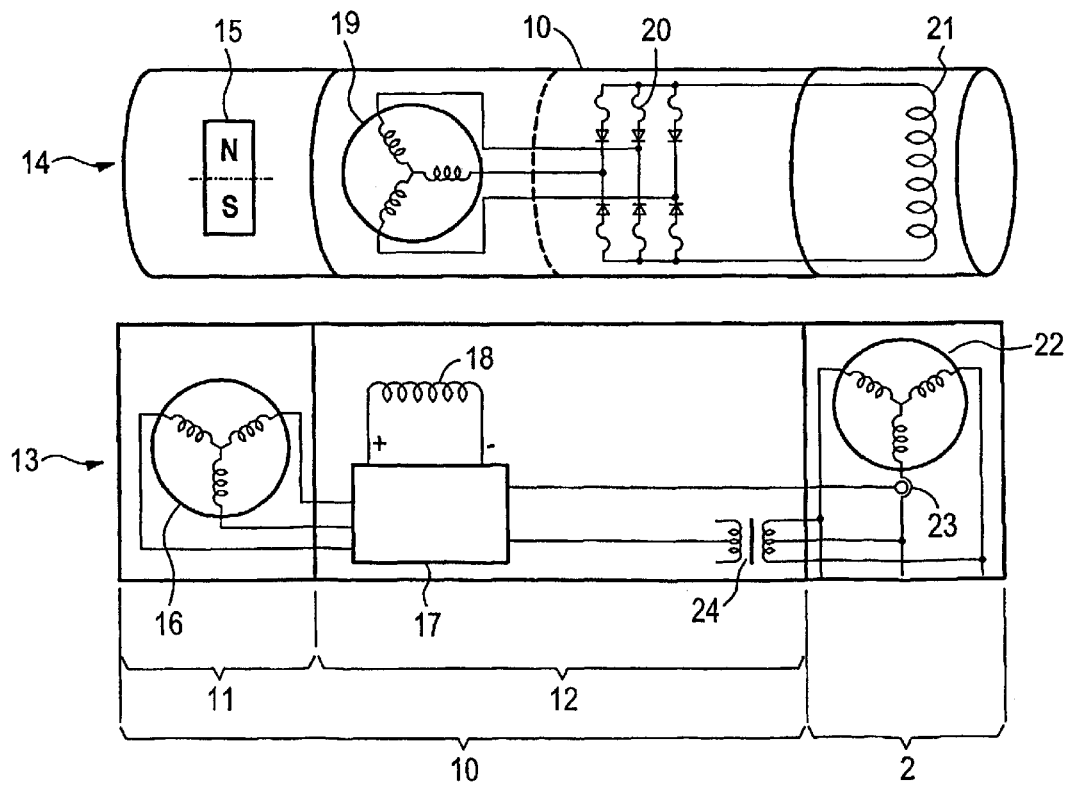
FIG. 2 shows a block diagram for the known operation of a turboset with rotating brushless exciter.

FIG. 2 shows the block diagram of a generator 2 which corresponds to the converter-fed motor 2 shown in FIG. 1 and has a brushless rotating rectifier exciter 10 which comprises a pilot exciter 11 and a main exciter 12. Both the generator 2 and the rectifier exciter 10 have stationary components 13 and rotating components 14. In the pilot exciter 11, a current is induced in a pilot excitation winding 16 by a rotating permanent magnet 15, this current being supplied to a voltage regulator 17, to which a stator winding 18 of the main exciter 12 is connected. Instead of the voltage supply from the main excitation winding 16 to the voltage regulator 17, a voltage supply from a network (not shown) to the voltage regulator 17 may alternatively be provided. The stator winding 18 generates a field which induces a current in a rotor winding 19 of the main exciter 12, this current being rectified by a rotating rectifier 20. This rectified current is supplied to a rotor winding 21 of the generator 2, this rotor winding 21 being attached as rotating field winding to the rotor 9 (not shown here). A three-phase current is thereby generated in a stator winding 22 of the generator 2, and this three-phase current can be fed into a network (not shown). The voltage regulator 17 is connected to the stator winding 22 via a current transformer 23 and a voltage transformer 24.

Figure 3:
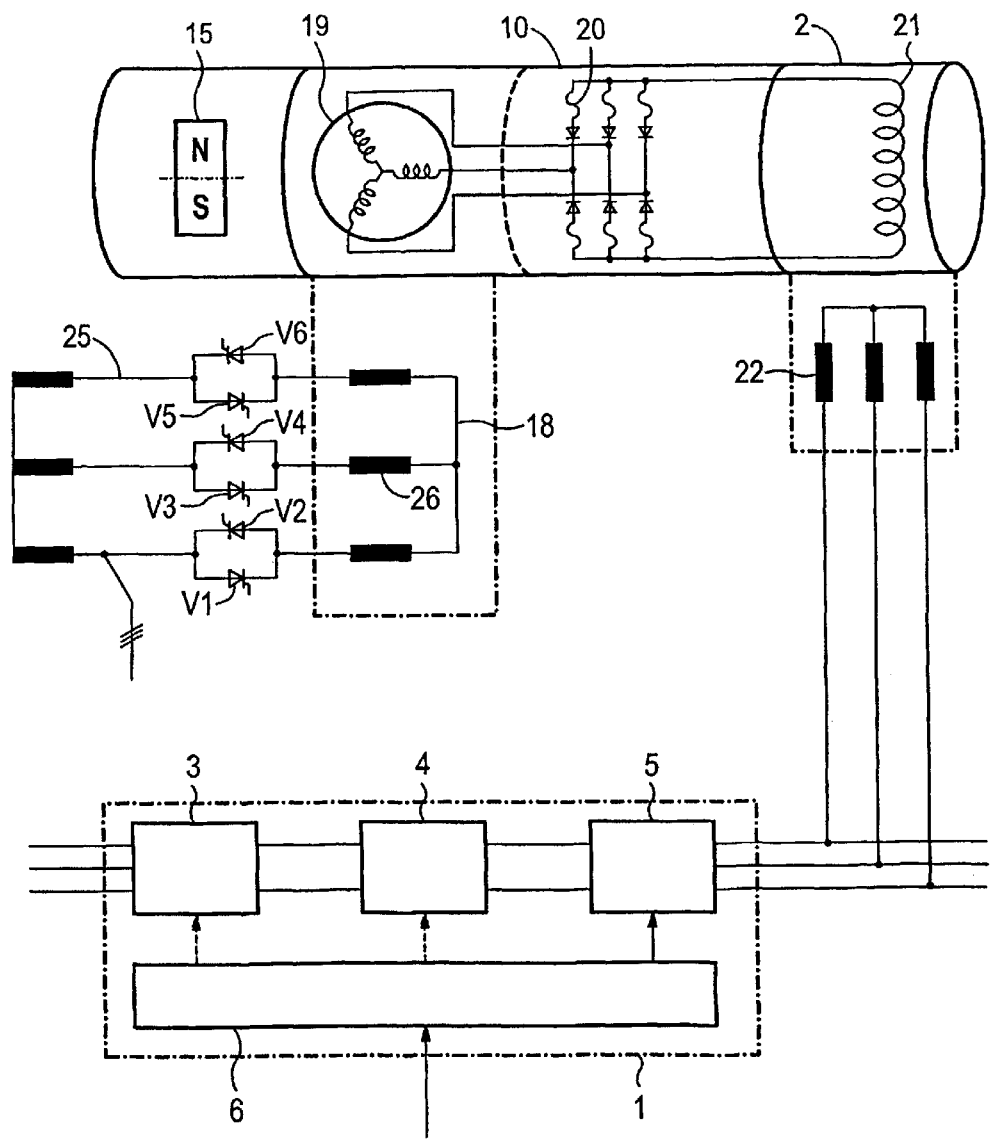
FIG. 3 shows a block diagram for the run-up of a turboset with rotating brushless exciter.

FIG. 3 shows a block diagram for the run-up operation according to the invention of the generator 2, which in this case acts as a converter-fed motor and has a brushless rotating rectifier exciter 10. A frequency-controlled three-phase current is supplied via the indirect converter 1 to the stator winding 22 of the generator 2 in a manner known per se (FIG. 1). In contrast thereto, however, the excitation current is not fed into the rotor winding 21 via slip rings 8 but is generated in the rectifier exciter 10. In this case, a three-phase current, for example with a frequency of 50 Hz, is supplied via a three-phase AC power controller 25 with thyristors V1–V6 to the stator winding 18, shown with three impedances 26, of the rectifier exciter 10. A rotary field is generated in the rectifier exciter 10 by the three-phase current in the stator winding 18, this rotary field rotating in the opposite direction to the rotor winding 19 and inducing a voltage there. This voltage serves to generate a current which flows through the rotor winding 21 of the generator 2 used as a frequency-controlled synchronous motor.

Figure 4:
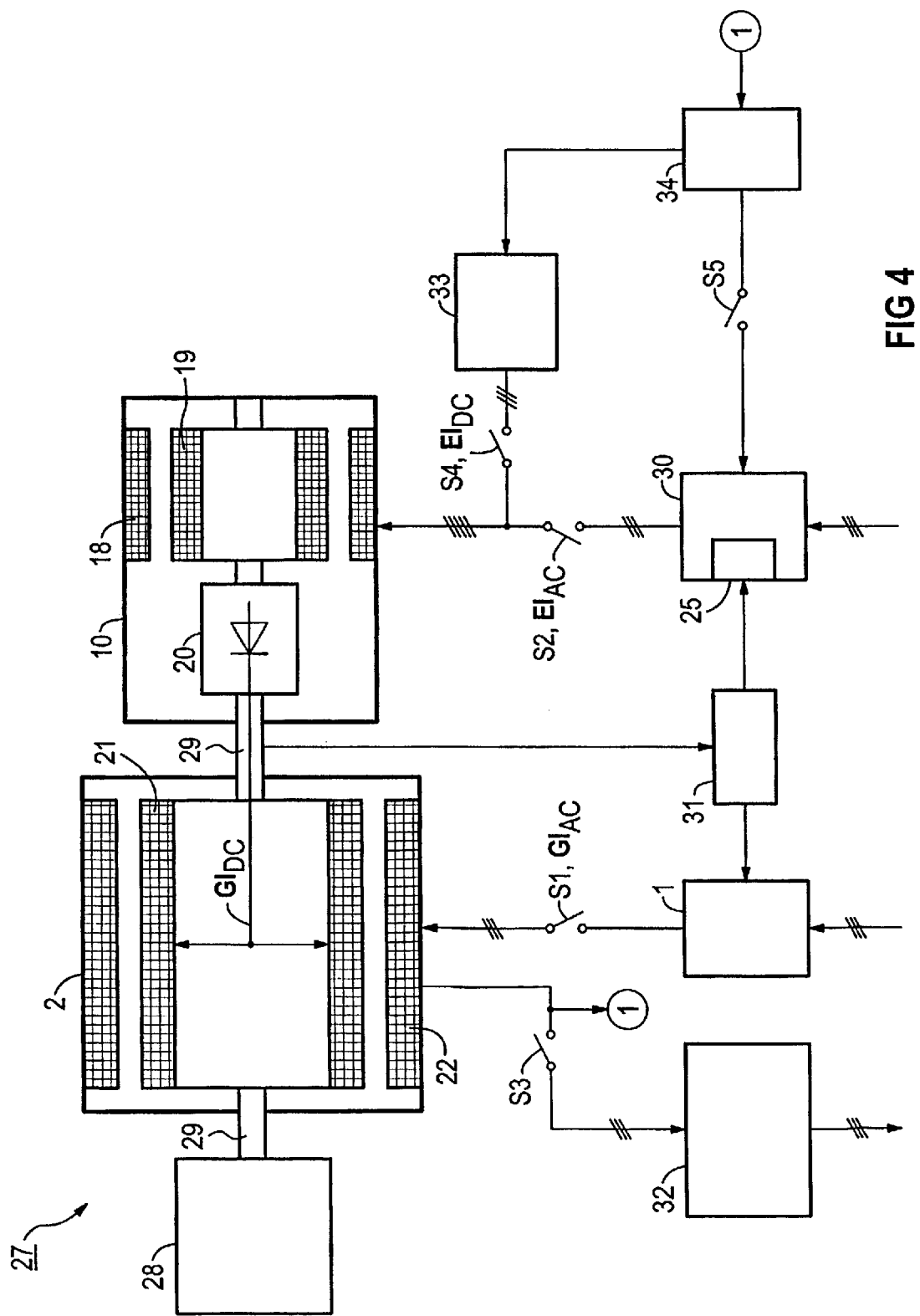
FIG. 4 shows a block diagram for the run-up and the operation of a turboset with rotating brushless exciter.

FIG. 4 schematically shows a turboset 27 with a gas turbine 28, the generator 2, the rectifier exciter 10 and a common shaft 29. During the run-up operation, direct current $GI_{DC}$ is fed from the rectifier exciter 10 into the rotor winding 21 of the generator 2. At the same time, the stator winding 22 of the generator 2 is supplied with frequency- and voltage-variable three-phase current $GI_{AC}$ via an indirect converter 1. During the run-up operation, therefore, the generator 2 acts as a converter-fed motor, which drives the turbine 28.

During the start-up operation, the stator winding 18 of the rectifier exciter 10 is supplied with three-phase current $EI_{AC}$ and variable voltage via an excitation starting device 30. The three-phase AC power controller 25 is part of the excitation starting device 30. The control coupling between the indirect converter 1 of the generator 2, the generator shaft 29 and the excitation starting device 30 of the rectifier exciter 10 is effected in the open-loop and control-loop control module 31. The rectifier exciter 10 works as an asynchronous generator, the rotor winding 19 of which feeds the rectifier 20. The current generated in the rotor winding 19 is rectified by the rectifier 20 rotating with the rotor winding 19 before it is passed as direct current $GI_{DC}$ to the rotor winding 21 of the generator 2. In this way, the rectifier exciter 10 serves to supply current to the rotor winding 21 of the generator 2. For the run-up of the turboset 27, therefore, neither slip rings nor a separate starting motor are required.

If the turbine 28 reaches a limit speed, required for further, independent run-up, of, for example, 1000 revolutions per minute, the indirect converter 1 is isolated from the generator 2 and the excitation starting device 30 is isolated from the rectifier exciter 10 by switching or control elements S1 and S2, respectively, which are shown symbolically.

During normal operation of the generator 2, the generated current is fed into the network via the generator switch S3 and the transformer 32. At the same time, the stator winding 18 of the rectifier exciter 10 can be supplied with direct current $EI_{DC}$ in a manner known per se via an excitation device 33 and a switch S4. The excitation device 33, which delivers the direct current $EI_{DC}$ as field current to the stator winding 18, is connected to a voltage regulator 34 for regulating the field current. Alternatively, the rectifier exciter 10, via the excitation starting device 30, which is now regulated by the voltage regulator 34, may be used for the power operation of the generator 2. The voltage regulator 34 is connected to the excitation starting device 30 via the switch S5. Likewise, the current generated in the rotor winding 21 of the generator 2 appears as a parameter in the voltage regulator 34.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of starting up a turbo including a gas turbine, a generator and an exciter, wherein the exciter has a exciter stator winding and a exciter rotor winding, comprising the steps of;

supplying a three-phase current to the exciter stator winding, the three-phase current inducing a voltage in the exciter rotor winding as an asynchronous generator, generating a current in the exciter rotor winding by the induced voltage being rectified by a rectifier rotating with the exciter rotor winding and the current being supplied as direct current to a generator rotor winding of the generator, and passing a three-phase current through a generator stator winding of the generator which thereby acts as a converter-fed motor.

2. The method according to claim 1, further comprising the step of controlling the direct current in the exciter rotor winding by varying a three-phase current supplied to the exciter.

3. The method according to claim 2, further comprising the steps of;

interrupting the supply of the three-phase current into the exciter stator winding at a point when a predetermined speed of the turbined has been reached, and isolating the generator stator winding of the generator from an indirect converter.

4. A method of starting up a power generation turboset including a turbine, a generator having a generator rotor winding and a generator stator winding and an exciter, having an a exciter stator winding, an exciter rotor winding, and an exciter rectifier comprising the steps of;

generating a three phase current, supplying the three-phase current to the exciter stator winding, the three phase current in the exciter winging inducing a voltage in the exciter rotor winding as an asynchronous generator, rotating the exciter rotor, generating a current in the exciter rotor winding due to the induced voltage being rectified by the exciter rectifier rotating with the excite rotor winding, supplying the current from the exciter rotor being direct current to the generator rotor winding, and generating a second three phase current passing the second three-phase current through the generator stator winding, whereby the generator acts as a converter-fed motor that rotates the turbo set.

5. The method according to claim 4, further comprising the step of controlling the direct current in the exciter rotor winding by varying the three-phase current supplied to the exciter.

6. The method according to claim 5, further comprising the steps of;

interrupting the supply of the three-phase current into the exciter stator winding at a point when a predetermined speed of the turbine has been reached, and isolating the generator stator winding from an indirect converter.

7. An apparatus for starting up and running a turboset having a gas turbine, a generator, and a rectifier exciter comprising, a stator winding of the rectifier exciter forming the excitation winding of an asynchronous generator, and the rectifier exciter having a rotatably arranged rectifier positioned therein which is electrically connected to a rotor winding of the generator, the stator winding of the generator being electrically connected to an indirect converter by means of a three-phase line.

8. The apparatus as claimed in claim 7, further comprising;

a three-phase AC power controller, which is electrically connected to the rotor winding of the generater wherein the three phase AC Power controller adjusts the direct current flow to the rotor winding of the generator.

* * * * *